United States Patent
Ohara et al.

(10) Patent No.: US 6,313,319 B1
(45) Date of Patent: Nov. 6, 2001

(54) METHOD FOR PURIFYING LACTIDE AND LACTIDE FOR FOOD ADDITIVES

(75) Inventors: Hitomi Ohara; Hisashi Okuyama, both of Kyoto; Makoto Ogaito, Nagaokakyo; Yasuhiro Fujii, Kyoto; Tatsushi Kawamoto, Hadano; Takashi Kawabe, Toyonaka; Yasumasa Horibe, Otsu, all of (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 09/554,101

(22) PCT Filed: Jun. 29, 1999

(86) PCT No.: PCT/JP99/03505
    § 371 Date: May 24, 2000
    § 102(e) Date: May 24, 2000

(87) PCT Pub. No.: WO00/18757
    PCT Pub. Date: Apr. 6, 2000

(30) Foreign Application Priority Data

Sep. 25, 1998 (JP) .................................................. 98-04287

(51) Int. Cl.$^7$ ........................ C07D 319/12; A23L 3/3499
(52) U.S. Cl. ........................ 549/274; 426/133; 426/268; 426/329; 426/654
(58) Field of Search ............................ 549/274; 426/133, 426/268, 329, 654

(56) References Cited

U.S. PATENT DOCUMENTS

| | | |
|---|---|---|
| 5,274,127 | 12/1993 | Sinclair et al. . |
| 5,319,107 | 6/1994 | Benecke et al. . |
| 5,332,839 | 7/1994 | Benecke et al. . |
| 5,420,304 | 5/1995 | Verser et al. . |
| 5,463,086 * | 10/1995 | Kubota et al. ........................ 549/274 |
| 5,502,215 | 3/1996 | Yamaguchi et al. . |

FOREIGN PATENT DOCUMENTS

| | | |
|---|---|---|
| 51-6673 | 3/1976 | (JP) . |
| 59-148777 | 8/1984 | (JP) . |
| 63-101378 | 5/1988 | (JP) . |
| 63-152956 | 6/1988 | (JP) . |
| 6-256340 | 9/1994 | (JP) . |
| 7-118259 | 5/1995 | (JP) . |
| 7-132056 | 5/1995 | (JP) . |
| 7-138253 | 5/1995 | (JP) . |
| 10-279577 | 10/1998 | (JP) . |
| WO92/05167 | 4/1992 | (WO) . |
| WO93/02075 | 2/1993 | (WO) . |
| WO93/18020 | 9/1993 | (WO) . |

* cited by examiner

Primary Examiner—Charanjit Aulakh
(74) Attorney, Agent, or Firm—Arent Fox Kintner Plotkin & Kahn, PLLC

(57) ABSTRACT

A crude lactide in a solid state or in an at least partially molten state is brought into contact with ethanol to form a slurry mixture, and then a solid form this slurry mixture is separated to yield a purified lactide having a high purity.

A crude lactide is recrystallized from a non-denatured or denatured ethanol to obtain a lactide for a food additive.

A lactide is applied widely to food additives. A coagulating agent for an animal and/or vegetable protein containing an optically active lactide as a main component, a food foaming agent containing a lactide as a main component, a food preservative containing a lactide as a main component and a pH regulating agent containing a lactide as a main component are provided.

53 Claims, No Drawings

METHOD FOR PURIFYING LACTIDE AND LACTIDE FOR FOOD ADDITIVES

TECHNICAL FIELD

The present invention relates to a method for purifying a lactide which is a dimeric cyclic ester of lactic acid, and more particularly, to a method for obtaining a purified lactide whose L-lactide and/or D-lactide content is high. Specifically, the present invention relates to a method for purifying a lactide for obtaining a highly pure lactide for food additives.

Furthermore, the present invention relates to a food additive employing such lactide.

BACKGROUND ART

A lactide has been useful as a starting material for producing a polylactic acid which is a biodegradable polymer. Thus, a ring-opening polymerization of a lactide yields a polylactic acid. In addition to the utility as a starting material for producing such polylactic acid, a utility of a lactide as a food additive such as a preservative, a pH regulating agent, a coagulating agent, an acidulant and an auxiliary expanding agent is expected.

A lactide is a dimeric cyclic ester of lactic acid, and exists as three optical-isomers, i.e., L-lactide formed from two L-lactic acid molecules, D-lactide formed from two D-lactic acid molecules and meso-lactide formed from L-lactic acid and D-lactic acid.

A lactide is produced usually by a reaction distillation method in which lactic acid is subjected to a dehydration condensation to obtain a polylactic acid having a relatively low molecular weight as an intermediate, which is then depolymerized and cyclized to form a lactide, which is isolated as a vapor from the system of reaction.

In such production method, a lactide vapor contains not only L-lactide and/or D-lactide and meso-lactide but also some impurities such as lactic acid monomer, a lactic acid polycondensate having a low molecular weight such as linear dimer and trimer of lactic acid and water and the like. In addition, other impurities derived from a starting lactic acid such as saccharides, amino acids and fatty acids other than lactic acid may also be contained.

Accordingly, it is necessary to purify, depending on the intended use, a crude lactide once cooled and recovered whereby reducing the impurities and meso-lactide contained therein as described above.

Thus, while a lactide is hydrolyzed to form lactic acid and a linear lactic acid polycondensate having a low molecular weight, meso-lactide undergoes far more extensive water absorption and hydrolysis when compared with L-lactide and D-lactide. Accordingly, a lactide having a high meso-lactide content undergoes a rapid hydrolysis as a whole, resulting in a higher concentration of acidic components such as lactic acid and a linear lactic acid polycondensate having a low molecular weight.

For example, when a lactide is employed as a food additive, one which gives a low acidity at an early stage after addition followed by a higher acidity at a later stage (in response to the maturing of the food) is preferred. When large amounts of meso-lactide, lactic acid and a linear lactic acid polycondensate having a low molecular weight are contained in a lactide, the acidity at an early stage after addition becomes high. Accordingly, it is preferable that the concentrations of meso-lactide, lactic acid and a linear lactic acid polycondensate having a low molecular weight in a lactide are as low as possible.

On the other hand, the melting points of L-lactide and D-lactide are both approximately 98° C., while that of meso-lactide is approximately 40° C. The melting point of lactic acid is 16 to 25° C., while a linear lactic acid polycondensate having a low molecular weight exists as a liquid at normal temperatures. As a result, a lactide, when used as a powder or a granule in the presence of high concentrations of meso-lactide, lactic acid and a linear lactic acid polycondensate having a low molecular weight, each of which has a melting point not higher than or close to normal temperatures, results in a poor fluidity of the lactide, which may lead to a poor workability. Accordingly, it is preferable that the concentrations of these substances in a lactide are as low as possible.

Also when a lactide is used as a food additive, the impurities contained in the lactide, such as saccharides, amino acids and fatty acids other than lactic acid, may cause deterioration or change in the taste of the food additive or a problematic coloring of the food additive. Therefore, it is preferable that the concentrations of these impurities in a lactide are as low as possible.

Various conventional methods for purifying a lactide are known, including a recrystallization method, a melt crystallization method, a rectification method, a water extraction method and the like.

For example. Japanese Examined Patent Publication No. 51-6673 discloses a method in which a lactide is recrystalized using a amyl alcohol or butylalcohol solvent. However, this method allows an organic solvent which is hazardous to human health to remain in the lactide once purified, thus being problematic when applied to a food additive.

Japanese Laid-Open Patent Publication No. 63-101378 discloses that a lactide is recrystallized from an alcohol having 1 to 6 carbon atoms, preferably from isopropyl alcohol, or is dissolved in such alcohol and then precipitated using a non-solvent. Japanese Laid-Open Patent Publication No. 7-118259 discloses a method in which a lactide is recrystallized from a lower alcohol and then recrystallized from benzene or equivalent. However, any of these methods is disadvantageous economically since it involves problematically extensive time period and operations in a step in which a crude lactide is dissolved in a solvent with heating and in a step in which a lactide is cooled to precipitate from the solution and also involves a large amount of a solvent and a low yield. In addition, each of these methods allows an organic solvent which is hazardous to human health to remain in the lactide once purified, thus being problematic when applied to a food additive.

Japanese Laid-Open Patent Publication No. 6-256340 discloses a method for purifying a crude lactide by a melt crystallization. However, a melt crystallization is disadvantageous economically since it involves the use of an expensive large scale device and also involves problematically extensive time period and operations in a step in which a lactide is cooled to precipitate or in a step in which a heating and a purification/dissolution are conducted. In addition, a step for separating a purified lactide which is conducted at a temperature higher than the melting point of a lactide allows a further degradation of a lactide to take place, thus allowing a problematic formation of lactic acid and a linear lactic acid polycondensate having a low molecular weight to take place. In order to obtain a lactide of a constant quality, a strict process control is required.

Published Japanese Translation Patent Publication No. 7-505150(WO93/18020) discloses a method for obtaining a highly pure lactide by a rectification. However, such rectification requires a complicated and expensive instrument and involves problematically extensive operations in a step in which a lactide is evaporated with heating or in a step in which a lactide is condensed with cooling, thus presenting an economical disadvantage. In addition, a step for separating a purified lactide which is conducted at a temperature higher than the melting point of a lactide allows a further degradation of a lactide to take place, resulting in a problematic formation of lactic acid and a linear lactic acid polycondensate having a low molecular weight. In order to obtain a lactide of a constant quality, a strict process control is required here again.

Japanese Laid-Open Patent Publication No. 7-165753 discloses a method in which a crude lactide is brought into contact with water to effect a purification. In this method, a lactide is brought into contact with water in an attempt to remove meso-lactide, but a sufficient removal of meso-lactide is associated inevitably with the hydrolysis and the removal also of a part of L-lactide and/or D-lactide, resulting in a reduced yield. Subsequently, the removed L-lactide and/or D-lactide undergoes a reaction with water, and can be recovered only in the form of lactic acid or a linear lactic acid polycondensate having a low molecular weight. The fact that the lactide which has been obtained from lactic acid through an extensive operation can be recovered only in the form of lactic acid or a linear lactic acid polycondensate having a low molecular weight means an extremely poor cost efficiency.

DISCLOSURE OF THE INVENTION

Object of the Invention

Accordingly, an object of the invention is to provide a method for purifying a lactide by which the problems associated with conventional methods can be solved and which produces a highly pure lactide at a high yield using simple facilities and simple processes. An additional object of the invention is to provide a method for purifying a lactide which do not allow an organic solvent which is hazardous to human health to remain and thus can preferably be used in food additives and which produces a purified lactide of a particle having good fluidity. A further object of the invention is to provide a purified lactide which is less expensive, highly pure and used preferably in food additives.

Furthermore, an object of the invention is to provide a food additive containing a lactide as a main component.

SUMMARY OF THE INVENTION

We made an effort and discovered that by bringing a crude lactide into contact with ethanol followed by separating the solid a purified lactide having a high L-lactide and/or D-lactide content can be obtained at a high yield, whereby establishing the present invention.

Thus, the invention is a method for purifying a lactide which comprises bringing a crude lactide in a solid state or in an at least partially molten state is brought into contact with ethanol to form a slurry mixture, and then separating a solid from the slurry mixture to yield a purified lactide having a high L-lactide and/or D-lactide content.

In this ethanol contact method, it is preferred that after separating a solid, said solid is dried under reduced pressure.

Also in this method, after separating a solid, said solid can be washed with water to remove ethanol. In such case, it is preferred that after washing a solid with water, said solid is dried under reduced pressure.

In this ethanol contact method, the ethanol may be both of a non-denatured ethanol or a denatured ethanol.

In addition, the invention is a purified lactide obtained by an ethanol contact method described above.

We further made an effort and discovered also that by recrystallizing a crude lactide using a non-denatured ethanol or a denatured ethanol as a solvent a lactide for a food additive can be obtained, whereby establishing the invention.

Thus, the invention is a method for purifying a lactide which comprises recrystallizing a crude lactide from a non-denatured ethanol to obtain a lactide for a food additive.

Furthermore, the invention is a method for purifying a lactide which comprises recrystallizing a crude lactide from a denatured ethanol to obtain a lactide for a food additive.

A denaturant contained in a denatured ethanol is preferred to be selected from flavors capable of being employed as food additives. When the denaturant contained in a denatured ethanol is a synthetic chemical substance, the denaturant is preferably at least one of ethyl acetate, butyl p-oxybenzoate, a white lac, a purified shellac, a white lac solution and a purified shellac solution.

Furthermore, the invention is a lactide for food additives recrystallized from a non-denatured ethanol. Still furthermore, the invention is a lactide for food additives recrystallized from a denatured ethanol.

The present invention also relates to a novel use of a lactide as a food additive such as a coagulating agent for an animal and/or vegetable protein, a food foaming agent, a food preservative, a pH regulating agent or an acidulant.

Thus, the present invention relates to a coagulating agent for a protein containing an optically active lactide as a main component.

The invention also relates to a food foaming agent containing a lactide as a main component.

Furthermore, the invention relates to a food preservative containing a lactide as a main component.

Still furthermore, the invention relates to a pH regulating agent containing a lactide as a main component.

A lactide employed in any of the applications described above may be one obtained by an inventive purification described above or by other methods.

According to the invention, a purified lactide having a high L-lactide and/or D-lactide content can be obtained using a simple device and simple procedure within a short period at a high yield. Also according to the invention, a purified lactide exhibiting a satisfactory workability can be obtained without any residual organic solvent which is hazardous to human health and can be obtained.

A purified lactide obtained according to the invention is less expensive and applied preferably to food additives.

DETAILED DESCRIPTION OF THE INVENTION

A purification method of the invention can be applied to a crude lactide obtained by a known method. For example, it may be a method described in Japanese Laid-Open Patent Publication No. 7-138253 in which a polylactic acid having a low molecular weight is obtained and then depolymerized in the presence of a catalyst to obtain a lactide, or a thin film depolymerizaiton of a lactic acid oligomer described in Published Japanese Translation Patent Publication No. 7-500091(WO93/02075), or a method described in Published Japanese Translation Patent Publication No.6-504762 (WO92/05167), U.S. Pat. Nos. 5,274,127, 5,332,839, 5,319, 107 and 5,420,304 in which a lactide is produced directly from lactic acid without forming a lactic acid oligomer as an intermediate. It is a matter of course that there is no limitation to the lactides produced by the methods listed above.

A lactic acid as a starting material for producing a lactide can for example be one whose concentration as lactic acid monomer is 50 to 95% by weight and which is produced by a synthesis or a fermentation. A lactic acid obtained by a synthesis contains L-lactic acid and D-lactic acid in equal amounts. While a lactic acid obtained by fermentation is a mixture of L-lactic acid and D-lactic acid, some contain L-lactic acid predominantly and the others contain D-lactic acid predominantly. In order to obtain a purified lactide for food additives, it is more preferably to use a lactic acid produced by fermentation rather than to use a lactic acid produced by a synthesis which employs a hazardous substance such as hydrocyanic acid or acetoaldehyde in a manufacturing process.

For producing a polylactic acid having a low molecular weight by polycondensing a lactic acid, a starting lactic acid is dehydrated generally in the presence or absence of a catalyst with heating under reduced pressure to convert to a polylactic acid having a weight-average molecular weight of 500 to 30,000.

The heating temperature in the reaction described above is 100 to 250° C., preferably 100 to 200° C. A temperature below 100° C. leads to an undesirably prolonged polycondensation, while a temperature exceeding 250° C. allows lactic acid and a lactic acid linear polycondensate having a low molecular weight and the like to be distilled out together with water, resulting in a problematically low yield. When a lactic acid obtained by fermentation is used to obtain a crude lactide having a high optical purity, the temperature is 100 to 200° C., preferably 100 to 180° C. in order to prevent a racemization, since a higher reaction temperature results in a lower optical purity of the crude lactide obtained. The pressure in such case is 100 Torr or less, preferably 50 Torr or less.

A catalyst employed in the step described above may for example be, but is not limited to, usually, elemental metals of IA group, IIA group, IIB group, IIIB group, IVA group, IVB group and VB group in the periodic table as well as oxides, hydroxides and chlorides thereof and other inorganic compounds and organic compounds and acids, each of which is employed alone or in combination. The amount of a catalyst is usually 5% by weight or less based on the starting lactic acid.

A catalyst of IA group may for example be sodium hydroxide, potassium hydroxide, lithium hydroxide, sodium oxide, potassium oxide, lithium oxide, sodium methoxide, potassium ethoxide and the like.

A catalyst of IIA group may for example be magnesium hydroxide, calcium hydroxide, barium hydroxide, magnesium oxide, calcium oxide, barium oxide, magnesium chloride, barium chloride and the like.

A catalyst of IIB group may for example be is zinc hydroxide, zinc oxide, zinc chloride and the like.

A catalyst of IIIB group may for example be aluminum oxide, aluminum chloride, aluminum triethoxide, aluminum octylate and the like.

A catalyst of IVA group may for example be titanium oxide, tetramethyl titanate, tetrabutyl titanate, zirconium, zirconium oxide, zirconium tetramethoxide, zirconium tetrabutoxide and the like.

A catalyst of IVB group may for example be germanium, germanium oxide, tin, tin oxide, tin chloride, tin oxalate, tin octylate, dibutyltin dilaurate, dibutyltin oxide, butyltin chlorooxide, lead oxide, silicon oxide and the like.

A catalyst of VB group may for example be antimony trioxide, antimony triacetate, triphenylantimony and the like.

A catalyst of an acid may for example be sulfuric acid, hydrochloric acid, nitric acid, phosphoric acid, toluenesulfonic acid and a cation exchange resin and the like.

By using a catalyst listed above, the polycondensation can be proceeded more rapidly, and the time period required for the reaction can be reduced. However, no use of a catalyst or a use of a catalyst only in a small amount is preferable when a lactic acid obtained by fermentation is employed to obtain a lactide having a high optical purity, since the use of such catalyst also promotes the racemization of lactic acid.

A polylactic acid having a low molecular weight thus obtained is depolymerized with heating under reduced pressure usually in the presence of a catalyst to form a lactide, which is taken as a vapor out of the system of reaction, whereby producing a crude lactide.

The heating temperature in the reaction described above is 130 to 300° C., preferably 160 to 250° C. A temperature below 130° C. leads to an undesirably prolonged polycondensation, while a temperature exceeding 300° C. allows a by-product such as acrylic acid or an acrylic acid polymer to be produced in a problematically increased amount. When a lactic acid obtained by fermentation is used to obtain a crude lactide having a high optical purity, the temperature is 130 to 260° C., preferably 130 to 220° C., more preferably 130 to 180° C. In order to prevent a racemization. The pressure is 100 Torr or less, preferably 50 Torr or less, and more preferably 20 Torr or less.

A catalyst employed for depolymerization may for example be, but is not limited to, usually, elemental metals of IA group, IIA group, IIB group, IIIB group, IVA group, IVB group and VB group in the periodic table as well as oxides, hydroxides and chlorides thereof and other inorganic compounds and organic compounds and acids, each of which is employed alone or in combination. Those catalysts exemplified typically here are those described above.

A catalyst may be used in an amount of 20% by weight or less based on a polylactic acid. However, in the case where a catalyst is employed in the polycondensation step for a polylactic acid having a low molecular weight and the catalyst remaining in the polylactic acid is enough to obtain a sufficient depolymerization rate, no further addition of the catalyst is required.

A crude lactide thus obtained usually contains impurities such as lactic acid monomer, a lactic acid polycondensate having a low molecular weight such as linear dimer and trimer of lactic acid as well as water, together with starting lactic acid-derived saccharides, amino acids and fatty acids other than lactic acid. In addition, a lactide also contains L-lactide and/or D-lactide as well as meso-lactide.

(Purification of Lactide by Ethanol Contact Method)

In an ethanol contact method of the invention, a crude lactide to be purified is brought into contact with ethanol to form a slurry mixture, and a solid is then separated from this slurry mixture.

A crude lactide to be purified may be in a solid or molten state. Alternatively, a part of the crude lactide may be in a molten state. Thus, a crude lactide once solidified may be purified, or a molten crude lactide obtained by depolymerizing a polylactic acid having a low molecular weight may be purified with its molten state being maintained without any solidification.

Regardless of the state of a crude lactide, a crude lactide forms a slurry mixture when brought into contact with ethanol. This contact between a crude lactide and ethanol can be effected in a batch process or a continuous process.

From a slurry mixture thus obtained, a solid is separated and recovered. This can be effected also in a batch process or a continuous process.

An operation of bringing a crude lactide into contact with ethanol and an operation for separating and recovering a solid may also be repeated several times. Thus, it is possible to perform a repetitive procedure in which, after bringing a crude lactide into contact with ethanol, a solid is separated and then the solid thus obtained is brought into contact again with a fresh ethanol and subsequently the solid is separated and recovered.

Ethanol employed in an ethanol contact method according to the invention is a liquid containing ethanol mainly, and includes a non-denatured ethanol and a denatured ethanol. The ethanol content may be 50% by weight or more, preferably 90% by weight or more, more preferably 95% by weight or more.

A denatured ethanol means a ethanol mixed with a denaturant. A denaturant to be mixed may be synthetic chemical substances and natural substances. Each of these denaturants may usually be added in an amount of 1 g to 200 g per 1 L of ethanol.

A synthetic chemical substance may for example be methanol, benzol, toluol, methylethylketone, denatonium benzoate, ethylene glycolmonoethylether, chloroform, diethyl carbonate, ethyl acetate, ethyl propionate, ethyl butyrate, hexane, an ethylether of an industrial grade, geraniol, octaacetylated sucrose, phenylethylether, diethylphthalate, an aqueous solution of alkylbenzene sulfonate, vinyl acetate monomer, heptane, isopropyl alcohol, butanol, ethyl acrylate, brucine, linalool, linalyl acetate, benzyl acetate, a seed acetic acid, a brewed acetic acid formalin, Rhodamine B, a white lac, a purified shellac, a white lac solution, a purified shellac solution, butyl p-oxybenzoate and the like.

Among those listed above, ethyl acetate, butyl p-oxybenzoate, a white lac, a purified shellac, a white lac solution and a purified shellac solution are preferred as a denaturant.

A natural substance may for example be a material capable of being used as a food additive such as a distilled vinegar, a recovered orange flavor, a recovered grape flavor, a recovered wine flavor, a natural butter flavor, a lactic acid obtained by fermentation, a fermented cereal extract, an orange oil, a lemon oil, a lime oil, a turmeric orange, vanilla extract, a recovered coffee flavor, a recovered miso flavor, a soy sauce oil essence, a malt essence, a chicory essence and the like. While each of these substances may be employed alone, it is employed usually in a mixture.

Among these denaturants, a flavor derived from a natural substance capable of being used as a food additive is particularly preferred for the purpose of obtaining a purified lactide for a food additive.

Typically, flavors H-1, H-2, H-3, H-4, H-6, H-9, H-10, H-11, H-12, H-13, H-14 available from HASEGAWA KORYO, Inc., flavors T-100, T-101, T-102, T-103, T-104, T-105, T-106, T-107, EDA-171 available from TAKASAGO KORYO KOGYO, Inc., a flavor S-201 available from SODA KORYO, Inc., a flavor DA- 40 available from RIKEN KORYO KOGYO, Inc. A denaturant employed may appropriately be selected based on the intended application of a food additive.

An ethanol mixed also with water in addition to a denaturant may also be employed, and the amount of water to be added is 0 to 10 parts by weight, preferably 0 to 5 parts by weight, more preferably 0 to 0.1 parts by weight per 100 parts by weight of ethanol. An amount of water exceeding 10 parts by weight is not preferred because the yield of a purified lactide is reduced.

It is a matter of course that a non-denatured ethanol is employed also preferably for the purpose of obtaining a purified lactide for a food additive. A non-denatured ethanol means ethanol containing no denaturant.

Ethanol, when being brought into contact with a crude lactide, is employed in an amount usually of 10 to 600 parts by weight, preferably 20 to 400 parts by weight, more preferably 30 to 200 parts by weight per 100 parts by weight of a crude lactide. An amount of ethanol less than 10 parts by weight tends to cause an insufficient separation of meso-lactide or various impurities. On the other hand, an amount exceeding 600 parts by weight results in a reduced cost efficiency due to a reduced yield of a crude lactide and an increased amount of ethanol required, although the separation of the impurities is satisfactory.

When a crude lactide in a solid state is brought into contact with ethanol, the crude lactide has a particle size capable of passing through a mesh No.4, preferably a mesh No.6, more preferably a mesh N.10. A crude lactide which can not pass through a mesh No.4 can not obtain a sufficient surface area where the crude lactide is in contact with ethanol, resulting in an insufficient separation of the impurities.

A crude lactide which has previously been ground into a particle passing through a mesh No.4 may be employed, and alternatively a crude lactide may be ground, as being in contact with ethanol, into a particle of 4-mesh size or smaller using a stirring device or equivalent.

A method for grinding a crude lactide previously is not particularly limited and may for example be a grinding method by using a coarse or medium grinder and the like such as a Jaw crasher mill, a hammer crasher mill, a roll crasher mill, a cage mill, a hammer mill and the like. After grinding, a particle which does not pass through a mesh No. 4 can be removed by a classifier and the like if desired.

A method for bringing a crude lactide in a solid state into contact with ethanol is not particularly limited, and may for example be a method in which a crude lactide and ethanol are placed in a vessel and allowed to stand whereby effecting a contact, a method in which the both are brought into contact in a vessel fitted with a stirring device, or a method in which the both are brought into contact in a solid-liquid extraction device. It is also possible to use two or more devices described above to effect a multistage contact between a crude lactide with ethanol.

On the other hand, a method for bringing a crude lactide in a liquid state into contact with ethanol is not particularly limited, and a method in which the contact is effected with stirring in order to obtain a uniform particle of the lactide which precipitates as a result of the contact with ethanol and a method in which a crude lactide in a liquid form is showered or sprayed via a nozzle, etc. into ethanol, and the like are effective. It is also possible that a slurry obtained by precipitation of a lactide by contact In a vessel fitted with a stirring device is brought into contact with a fresh ethanol again in a solid-liquid extraction device.

Such stirring device may for example be a rotary blade stirring device such as a double ribbon blade stirring device, a full- zone blade stirring device, a disk turbine blade stirring device and a homomixer, a stirring device by means of jet or circulation flow, a stirring device by means of a static mixer and the like. When a crude lactide is ground by using a stirring device after or at the same time with mixing a crude lactide and ethanol, those which are effective among the stirring devices described above are a disk turbine blade stirring device and a homomixer, etc. with which a higher shearing effect is obtained.

A solid-liquid extraction device may for example be a rotocell extractor, a Kennedy extractor, a BONNOTO extractor and the like. Any of these solid-liquid extraction device can effect a separation of a solid with a contact between a crude lactide and ethanol within an identical device. However, since the ethanol content in the solid thus separated is high, it is preferable to perform the separation step again using another device.

In the invention, the temperature at which a crude lactide is brought into contact with ethanol is preferably low for the purpose of preventing the degradation due to the reaction of L-lactide and/or D-lactide with ethanol or water, and is usually 0 to 70° C., preferably 10 to 50° C., more preferably 20 to 40° C.

For example, when a crude lactide in a molten state is brought into contact with ethanol, or when the temperature is raised because of a liquid friction as a result of a stirring and the like, it is preferred to bring a crude lactide into contact with ethanol with cooling in order to prevent the increase in the contact temperature.

While the time period during which a crude lactide is in contact with ethanol varies depending on the capacity of the device and the purity of the purified lactide to be obtained, it is usually 1 minute to 10 hours.

In the invention, a solid is separated from a slurry mixture obtained by means of a contact between a crude lactide and ethanol. A lactide can be recovered also from the ethanol solution after separating the solid by means of a crystallization, a concentration and the like. This recovery can not be effected by the purification method via a contact with water described in Japanese Laid-Open Patent Publication No. 7-165753,. and is one of the substantial advantages attributable to the invention.

A method for separating a solid is not particularly limited, and may for example be a separation method employing a centrifugal sedimentation machine, a centrifugal filtration machine and a pressure filtration device. Among these machines, a machine having a function of rinsing a solid is effective in performing a contact between a solid and ethanol simultaneously with a separation of the solid in an identical machine.

A centrifugal sedimentation machine may for example be a standing basket type centrifugal sedimentation machine, a screw decanter type centrifugal sedimentation machine and the like. A centrifugal filtration machine may for example be a standing basket type centrifugal filtration machine, a screw decanter type centrifugal filtration machine, a conical screen type centrifugal filtration machine and the like. A pressure filtration device may for example be a gravity filter, a pressurizing filter, a vacuum filter and the like.

As a result of the procedure described above, a purified lactide solid which is free from meso-lactide or other impurities can be obtained.

In the invention, after separating a solid as described above, it is preferable to wash the solid once separated with water in order to remove ethanol from the solid. By washing with water, the ethanol content in a purified lactide can significantly be reduced and the problems associated with the purified lactide, such as a residual ethanol odor, can be overcome.

To wash with water, a solid is brought into contact with water. A washing procedure may be in a batch process or a continuous process. The washing procedure may also be repeated several times. Thus, it is possible to perform a repetitive procedure in which a solid is brought into contact with water and then separated, and the solid thus obtained is brought further into contact with a fresh water, and then a solid is separated and recovered.

In this washing procedure, water is employed in an amount usually of 10 to 200 parts by weight, preferably 20 to 100 parts by weight, more preferably 30 to 60 parts by weight per 100 parts by weight of a solid separated after being in contact with ethanol. An amount of washing water less than 10 parts by weight results in a slightly low ethanol removing effect. An amount exceeding 200 parts by weight results in a reduced yield of a purified lactide.

The temperature at which water is brought into contact for washing is preferably low for preventing a degradation of L-lactide and/or D-lactide, and is usually 0 to 40° C., preferably 10 to 30° C., more preferably 10 to 20° C.

Since the time period during which water is brought into contact for washing is preferably a short period for preventing a degradation of L-lactide and/or D-lactide and a time period required for dissolution of ethanol in water is sufficient, it is usually 10 seconds to 20 minutes, preferably 10 seconds to 5 minutes, more preferably 10 seconds to 1 minute.

When water is brought into contact for washing, a device similar to that employed to bring a crude lactide into contact with ethanol described above can for example be employed. When a solid is separated from a slurry after the contact with water, a device similar to a solid separation device described above can for example be employed. Among these devices, a centrifugal filtration and a pressure filtration device, having a function of rinsing a solid, are preferred particularly since then reduce the time period of the contact with water and enable a uniform contact with water.

In the invention, a solid separated after the contact with ethanol as described above or a solid obtained after washing with water is preferably dried under reduced pressure. Usually, in a purified lactide obtained as a solid, employed ethanol, employed water and sometimes together with substances contained in ethanol (for example, water, methanol, isopropyl alcohol, methylethylketone, ethyl acetate and the like) are deposited. Such deposition may impart a reduced fluidity of the particle or a problematic odor to a purified lactide obtained. Accordingly, a solid is preferably dried under reduced pressure to reduce such depositing substances.

The drying under reduced pressure is conducted preferably at a low temperature for the purpose of preventing the degradation due to the reaction of a lactide with ethanol or water, etc. as a result of heating, and the drying under reduced pressure may be conducted usually 10 to 95° C., preferably 10 to 60° C., at a pressure of about 0.01 to 100 Torr. It is also possible to perform a lyophilization at a pressure of about 0.001 to 10 Torr at a temperature not higher than 0° C. While the drying time period varies depending on the capacity of the drying device, the amount of a lactide to be dried, or the ethanol content and the water content of a purified lactide to be obtained, it is usually 5 minutes to 10 hours.

When a drying under reduced pressure with heating is performed, a device which can be used may for example be, but is not limited to, a rack stage drier, a cylindrical stirring drier, a conical rotary drier and the like. When a lyophilization is performed, a device which can be used may for example be, but is not limited to a rack stage drier.

(Purification of Lactide by Ethanol Recrystallization)

In an ethanol recrystallization method according to the invention, a crude lactide is first dissolved in ethanol. Then from a lactide solution a lactide crystal is precipitated precedently to obtain a slurry mixture, and then from this mixture a solid is separated. Usually, the solid thus separated is dried to obtain a purified lactide.

Alternatively, a series of the operations from the dissolution of a crude lactide in ethanol through the separation of a solid precipitated may be repeated several times. Usually, the solid thus separated is dried to obtain a purified lactide.

Ethanol employed in an ethanol recrystallization method according the invention is a liquid containing ethanol mainly similarly as in the ethanol contact method described above, and includes both of a non-denatured ethanol and a denatured ethanol. The ethanol content may be 50% by weight or more, preferably 90% by weight or more, more preferably 95% by weight or more.

A denatured ethanol means a ethanol mixed with a denaturant. A denaturant to be mixed may be synthetic chemical substances and natural substances. Each of these denaturants may usually be added in an amount of 1 g to 200 g per 1 L of ethanol.

As a synthetic chemical substance, any of those described above can be employed. Among those described above, ethyl acetate, butyl p-oxybenzoate, a white lac, a purified shellac, a white lac solution and a purified shellac solution are preferred as a denaturant.

As a natural substance, any of those described above can be employed. While each of those substances may be employed alone, it is employed usually in a mixture.

Among these denaturants, a flavor derived from a natural substance capable of being used as a food additive is particularly preferred for the purpose of obtaining a purified lactide for a food additive.

Typically, flavors H-1, H-2, H-3, H-4, H-6, H-9, H-10, H-11, H-12, H-13, H-14 available from HASEGAWA KORYO, Inc., flavors T-100, T-101, T-102, T-103, T-104, T-105, T-106, T-107, EDA-171 available from TAKASAGO KORYO KOGYO, Inc., a flavor S-201 available from SODA KORYO, Inc., a flavor DA-40 available from RIKEN KORYO KOGYO, Inc. A denaturant employed may appropriately be selected based on the intended application of a food additive.

An ethanol mixed also with water in addition to a denaturant may also be employed, and the amount of water to be added is 0 to 10 parts by weight, preferably 0 to 5 parts by weight, more preferably 0 to 0.1 parts by weight per 100 parts by weight of ethanol. An amount of water exceeding 10 parts by weight is not preferred because the yield of a purified lactide is reduced.

It is a matter of course that a non-denatured ethanol is employed also preferably for the purpose of obtaining a purified lactide for a food additive. A non-denatured ethanol means ethanol containing no denaturant.

In an ethanol recrystallization method, the amount of a denatured ethanol or a non-denatured ethanol employed for dissolving a crude lactide may appropriately be selected based on the purity of a crude lactide to be purified, the recrystallization procedure and the quality of a purified lactide to be obtained and is usually 50 to 500 parts by weight, preferably 100 to 200 parts by weight per 100 parts by weight of a crude lactide. An amount of ethanol less than 50 parts by weight may cause a necessity of a prolonged period for dissolving a crude lactide, or may result in an insufficient dissolution or a reduced purity of a purified lactide. On the other hand, an amount of ethanol exceeding 500 parts by weight results in a poor yield of a purified lactide, and the use of a large amount of ethanol itself is disadvantageous economically.

The dissolution of a crude lactide in ethanol is performed usually by increasing the solubility with heating. The heating temperature is generally 40 to 75° C., preferably 50 to 70° C., more preferably 55 to 65° C. A heating temperature exceeding 75° C. results in a reaction of a lactide with ethanol or water contained in ethanol, which may lead to a reduced lactide yield. This procedure for dissolving a crude lactide in ethanol may be performed in a batch process or a continuous process.

A device for dissolving a crude lactide is not particularly limited and may for example be a vessel fitted with a stirring device.

Such stirring device may for example be a rotary blade stirring device such as a double ribbon blade stirring device, a full-zone blade stirring device, a disk turbine blade stirring device and a homomixer, a stirring device by means of jet or circulation flow, a stirring device by means of a static mixer and the like.

After dissolving a crude lactide in ethanol, a lactide crystal is precipitated. The crystal is precipitated usually by cooling and/or distilling a solvent off. Thus, a method in which the saturation concentration is reduced by cooling, a method in which a part of the solvent is distilled off by heating or reducing the pressure to reduce the solvent volume whereby the quantity to be dissolved is reduced, or a method in which a part of the solvent is distilled off, for example, under reduced pressure while reducing the temperature of the solution by means of the latent heat of the vaporized solvent whereby reducing the solvent volume and also reducing the saturation solubility are employed. This procedure for precipitating a lactide crystal may be performed in a batch process or a continuous process.

When a lactide solution is cooled to precipitate a crystal, it is cooled usually to a temperature of 30 to −10° C., preferably 25 to 0° C., more preferably 20 to 5° C.

A device for precipitating a lactide crystal precedently is not particularly limited, and may be a vessel fitted with a stirring device employed for dissolving a crude lactide in ethanol. Those which can also be employed are a D.T.B. type crystallizing device, a D.P. type crystallizing device, a crystal-OSLO type crystallizing device, a conical type crystallizing device, a turbulence type crystallizing device and the like.

From a slurry mixture obtained by precipitating a crystal, a solid is separated. Also from the ethanol after separating the solid, a lactide can be recovered by means of a crystallization, a concentration and the like.

While a separating device is not particularly limited, it may for example be a centrifugal sedimentation machine, a centrifugal filtration machine and a pressure filtration device. Among these machines, a machine having a function of rinsing a solid is effective since both of separating a solid and rinsing the solid once separated can be performed in an identical machine.

A centrifugal sedimentation machine may for example be a standing basket type centrifugal sedimentation machine, a screw decanter type centrifugal sedimentation machine and the like. A centrifugal filtration machine may for example be a standing basket type centrifugal filtration machine, a screw decanter type centrifugal filtration machine, a conical screen type centrifugal filtration machine and the like. A pressure filtration device may for example be a gravity filter, a pressurizing filter, a vacuum filter and the like.

A solid once separated is washed further with fresh ethanol if necessary. Such washing procedure provides a lactide having a higher purity. Usually, a solid after washing is further dried to obtain a purified lactide.

While the amount of ethanol employed in this washing procedure may be selected at will, the amount of ethanol is usually 10 to 300 parts by weight, preferably 20 to 150 parts by weight, more preferably 30 to 70 parts by weight per 100 parts by weight of a solid. An amount of ethanol less than 10 parts by weight may prevent a uniform washing, or may result in a reduced impurity removing effect. On the other hand, an amount of ethanol exceeding 300 parts by weight results in a poor yield of a purified lactide, and the use of a large amount of ethanol is disadvantageous economically.

In the invention, a solid separated is preferably dried under reduced pressure. Usually, in a lactide obtained as a solid, employed ethanol, employed water sometimes together with substances contained in a denatured ethanol are deposited. Such deposition may impart a reduced fluidity of the particle or a problematic odor to a purified lactide obtained.. Accordingly, a solid is preferably dried under reduced pressure to reduce such depositing substances.

The drying under reduced pressure is conducted preferably at a low temperature for the purpose of preventing the degradation due to the reaction of a lactide with ethanol or water, etc. as a result of heating, and the drying under reduced pressure may be conducted usually 10 to 95° C., preferably 10 to 60° C., at a pressure of about 0.01 to 100 Torr. It is also possible to perform a lyophilization at a pressure of about 0.001 to 10 Torr at a temperature not higher than 0° C. While the drying time period varies depending on the capacity of the drying device, the amount of a lactide to be dried, or the ethanol content and the water content of a purified lactide to be obtained, it is usually 5 minutes to 10 hours.

When a drying under reduced pressure with heating is performed, a device which can be used may for example be, but is not limited to, a rack stage drier, a cylindrical stirring drier, a conical rotary drier and the like. When a lyophilization is performed, a device which can be used may for example be, but is not limited to a rack stage drier.

(Use of Lactide as Food Additive)

In the field of a food industry, glucono-δ-lactone has been employed as a coagulating agent, an auxiliary expanding agent and a food preservative. In the production of a sake, a spirit "Shochu" and other lactic acid-containing liquors and soft drinks, a lactic acid fermentation is conducted or a lactic acid is incorporated.

In the production of a yogurt, a cheese and the like, a lactic acid produced by a lactic acid fermentation has been used to coagulate a protein. Subsequently, in view of productivity and quality consistency, a lactic acid and glucono-δ-lactone are brought into use.

Nevertheless, several problems such as that (1) a lactic fermentation makes the production time too long, that (2) an addition of a lactic acid gives a rapid reduction in pH, and that (3) glucono-δ-lactone undergoes a slightly rapid degradation, are experienced.

Accordingly, an additive undergoing a slower degradation when compared with glucono-δ-lactone is desired. A lactide undergoes the degradation more slowly than glucono-δ-lactone does and in acids produced by degradation lactic acid exhibits a sour taste which is similar to that of a natural lactic fermentation food product and thus is more preferable than gluconic acid.

Thus, the present invention relates also to a novel use of a lactide as a food additive such as a coagulating agent for an animal and/or vegetable protein, a food foaming agent, a food preservative, a pH regulating agent or an acidulant.

When a lactide is used as a food additive, the lactide is hydrolyzed and then is present mostly as a lactic acid at the time of ingestion. When an optically active L-lactide (LL-lactide) is used, L-lactic acid is ingested and L-lactic acid has the following advantageous properties when compared with D-lactic acid.

(A) The lactic acid in a human body is known to be a L-isomer.
(B) FAO & WHO recommend the use of L-lactic acid in a food for an infant or in Ringer's solution (Toxicological evaluations of certain food additives with a review of general principles and of specifications. World Health Organization, Geneva, p23, 1974).
(C) An accumulation of D-lactic acid causes a damage in a D-2-hydroxy acid dehydrogenase defect brain (Oh, M. S., Pheips, K. R., Traube, M., Saldiver, J. L. B., Boxhill, C., and Carroll, H. J. (1979), D-lactic acidosis in a man with the short-bowel syndrom. New Engl.J.Med., 301:249–252).

The present invention is a coagulating agent for a protein containing an optically active lactide as a main component. This coagulating agent for a protein can be applied both of an animal protein and a vegetable protein.

In this coagulating agent for a protein, an optically active lactide is preferably in an L-isomer. The optical purity of L-lactide may for example be 70%ee or higher, preferably 80%ee or higher, more preferably 90%ee or higher. In this context, the optical purity (%ee) of L-lactide is defined as $100 \times (L-D)/(L+D)$. The L-lactide content in the total amount of the lactides may for example be 85% by weight or more, preferably 90% by weight or more, more preferably 95% by weight or more.

Alternatively, the coagulating agent for a protein of the invention contains an optically active lactide as a D-isomer. The optical purity of D-lactide may for example be 70%ee or higher, preferably 80%ee or higher, more preferably 90%ee or higher. In this context, the optical purity (%ee) of D-lactide is defined as $100 \times (D-L)/(L+D)$. The D-lactide content in the total amount of the lactides may for example be 85% by weight or more, preferably 90% by weight or more, more preferably 95% by weight or more.

In a coagulating agent for a protein of the invention, the amount of a lactic acid monomer and/or a linear lactic acid polymer contained in a lactide is preferably 2.0% by weight or less. A lactide is preferably one synthesized from a lactic acid obtained by fermentation as a starting material. Furthermore, a lactide is preferably one synthesized from a lactic acid as a starting material which is obtained by fermentation and whose optical purity of the L-isomer or D-isomer is 90%ee or higher.

This coagulating agent for a protein is used to produce a food product such as yogurt, cheese, tofu, ham, sausage or boiled fish paste.

A lactide used as a coagulating agent for a protein may be one produced by an inventive purification method described above or by other methods.

The present invention is a food foaming agent containing a lactide as a main component.

In this food foaming agent, a lactide is preferably one which is optically active. In this food foaming agent, an optically active lactide is preferably an L-isomer. The optical purity of L-lactide may for example be 70%ee or higher, preferably 80%ee or higher, more preferably 90%ee or higher. In this context, the optical purity (%ee) of L-lactide is defined as $100 \times (L-D)/(L+D)$. The L-lactide content in the total amount of the lactides may for example be 85% by weight or more, preferably 90% by weight or more, more preferably 95% by weight or more.

Alternatively, a food foaming agent of the invention contains an optically active lactide as a D-isomer. The optical purity of D-lactide may for example be 70%ee or higher, preferably 80%ee or higher, more preferably 90%ee or higher. In this context, the optical purity (%ee) of D-lactide is defined as 100×(D−L)/(L+D). The D-lactide content in the total amount of the lactides may for example be 85% by weight or more, preferably 90% by weight or more, more preferably 95% by weight or more.

In a food foaming agent of the invention, the amount of a linear lactic acid polymer contained in a lactide is preferably 2.0% by weight or less. Furthermore, a lactide is preferably one synthesized from a lactic acid as a starting material which is obtained by fermentation and whose optical purity of the L-isomer or D-isomer is 90%ee or higher.

A lactide used as a food foaming agent may be one produced by an inventive purification method described above or by other methods.

The present invention is a food preservative containing a lactide as a main component.

In this food preservative, a lactide is preferably one which is optically active. In this food preservative, an optically active lactide is preferably an L-isomer. The optical purity of L-lactide may for example be 70%ee or higher, preferably 80%ee or higher, more preferably 90%ee or higher. In this context, the optical purity (gee) of L-lactide is defined as 100×(L−D)/(L+D). The L-lactide content in the total amount of the lactides may for example be 85% by weight or more, preferably 90% by weight or more, more preferably 95% by weight or more.

Alternatively, a food preservative of the invention contains an optically active lactide as a D-isomer. The optical purity of D-lactide may for example be 70%ee or higher, preferably 80%ee or higher, more preferably 90%ee or higher. In this context, the optical purity (tee) of D-lactide is defined as 100×(D−L)/(L+D). The D-lactide content in the total amount of the lactides may for example be 85% by weight or more, preferably 90% by weight or more, more preferably 95% by weight or more.

In a food preservative of the invention, the amount of a linear lactic acid polymer contained in a lactide is preferably 2.0% by weight or less. Furthermore, a lactide is preferably one synthesized from a lactic acid as a starting material which is obtained by fermentation and whose optical purity of the L-isomer or D-isomer is 90%ee or higher.

A lactide used as a food preservative may be one produced by an inventive purification method described above or by other methods.

The present invention is a pH regulating agent containing a lactide as a main component.

In this pH regulating agent, a lactide is preferably one which is optically active. In this pH regulating agent, an optically active lactide is preferably an L-isomer. The optical purity of L-lactide may for example be 70%ee or higher, preferably 80%ee or higher, more preferably 90%ee or higher. In this context, the optical purity (%ee) of L-lactide is defined as 100×(L−D)/(L+D). The L-lactide content in the total amount of the lactides may for example be 85% by weight or more, preferably 90% by weight or more, more preferably 95% by weight or more.

Alternatively, a pH regulating agent of the invention contains an optically active lactide as a D-isomer. The optical purity of D-lactide may for example be 70%ee or higher, preferably 80%ee or higher, more preferably 90%ee or higher. In this context, the optical purity (%ee) of D-lactide is defined as 100×(D−L)/(L+D). The D-lactide content in the total amount of the lactides may for example be 85% by weight or more, preferably 90% by weight or more, more preferably 95% by weight or more.

In a pH regulating agent of the invention, the amount of a linear lactic acid polymer contained in a lactide is preferably 2.0% by weight or less. Furthermore, a lactide is preferably one synthesized from a lactic acid as a starting material which is obtained by fermentation and whose optical purity of the L-isomer or D-isomer is 90%ee or higher.

A lactide used as a pH regulating agent may be one produced by an inventive purification method described above or by other methods.

MODE FOR CARRYING OUT THE INVENTION

The present invention is further described in the following examples which are not intended to restrict the invention.

LACTIDE SYNTHESIS EXAMPLE 1

A 2L SUS separable flask fitted with a thermometer, a stirrer, a condenser, a distillate receiver, a depressurizer, a thermostat and the like received 1000 g of lactic acid (available from Purac, HS-88; Concentration as lactic acid monomer: 88.1% by weight, Optical purity: 99.2% e.e.). The reaction was performed first under normal pressures at 130° C. for 2 hours and then under reduced pressure with heating from 130° C. to 160° C. gradually over 4 hours, whereby obtaining approximately 703 g of a polylactic acid whose weight-average molecular weight based on a GPC analysis was 2150.

To this polylactic acid having a low molecular weight, 10.0 g of tin octylate was added and the mixture was heated under reduced pressure gradually from 160° C. to 200° C. to recover 690 g of a crude lactide as a distillate over about I hour and 45 minutes.

The composition of the crude lactide thus obtained was analyzed by a high performance liquid chromatography (HPLC), which revealed L-lactide and D-lactide:92.54% by weight, meso-lactide:3.29% by weight, linear lactic acid dimer: 0.77% by weight and lactic acid:3.40% by weight.

EXAMPLE 1

Ethanol Contact Method

The crude lactide obtained in Synthesis example 1 was ground by using a mortar, and allowed to pass through a 10-mesh sieve. 50 g of the crude lactide which passed through this sieve was mixed with 15 g of a 99% strong 1st grade non-denatured ethanol (brewed alcohol) at 25° C. in a beaker to obtain a slurry mixture, which was stirred by using a stirrer for 15 minutes. This slurry was transferred to a glass filter (Buchner type, Maximum pore size: 20 to 30 µm) mounted on a filtrate receiver, which was aspirated by aspirator for approximately 1 minute to effect a suction filtration of the liquid in the slurry.

After filtering with suction, the glass filter received further 15 g of a 99% strong 1st grade non-denatured ethanol (brewed alcohol), at 25° C. and the filtrate receiver was aspirated by aspirator for approximately 1 minute to effect a suction filtration.

A solid thus separated was dried by using a rotary evaporator at 40° C. and 4 Torr for 1 hour to obtain 43.9 g of a purified lactide (purification yield: 87.8%).

The composition of the crude lactide thus obtained was analyzed by an HPLC, which revealed L-lactide and D-lactide: 98.21% by weight, meso-lactide: 1. 18% by weight, linear lactic acid dimer:0.24% by weight and lactic acid:0.37% by weight.

The ethanol content of this purified lactide, when determined by using a gas chromatography (GC), was 540 ppm, and a slight ethanol odor was experienced. The moisture content of this purified lactide, when determined by using a Karl Fischer's moisture meter, was 35 ppm.

The purified lactide obtained in this example was a particle having good fluidity, and its fluidity was not lost even after storage at 20° C. for 1 month while being closed tightly.

Calculation of L-lactide in Purified Lactide

In the HPLC analysis of the purified lactide described above, the sum of L-lactide and D-lactide was determined, since this HPLC analysis could discriminate meso-lactide from D-lactide or L-lactide, but could not D-lactide from L-lactide.

Accordingly, the purified lactide obtained was hydrolyzed and subjected to an HPLC analysis, which revealed that the optical purity of L-lactic acid was 97.0%ee. Therefore, the concentration of L-lactide in the total amount of the lactides was 98.9% by weight or more, based on the calculation described below. In this context, the total amount of the lactides means the entire mass of the purified lactides, which corresponded to the sum of L-lactide, D-lactide, meso-lactide, L- and D-lactic acids and a linear lactic acid dimer.

Calculation

The following values:

Concentration of L- and D-lactides: V% by weight;

Optical purity of L-lactic acid after hydrolysis: X%ee;

Concentration of meso-lactide: Y% by weight;

Concentration of L- and D-lactic acids: Z% by weight; and,

Concentration of linear lactic acid dimer: W% by weight; can be obtained by the determinations.

On the other hand, a L-lactide concentration was designated as an A% by weight, and a D-lactide concentration was designated as a B% by weight. In this context, all of the lactic acid and the linear dimer are assumed to be D-isomers for the purpose of calculating the minimum possible concentration of L-lactide.

The concentration of D-lactic acid after hydrolysis is the sum of the followings.

Those derived from D-lactide, based on the consideration that 1 molecule of D-lactide whose molecular weight is 144 yields two molecules of D-lactic acid whose molecular weight is 90:

(180/144)B% by weight;

Those derived from meso-lactide, based on the consideration that 1 molecule of meso-lactide whose molecular weight is 144 yields two molecules of D-lactic acid whose molecular weight is 90:

(90/144)Y% by weight;

Lactic acid; Z% by weight;

Those derived from a linear dimer, based on the consideration that 1 molecule of the linear dimer whose molecular weight is 162 yields two molecules of D-lactic acid whose molecular weight is 90;

(180/162)W% by weight.

Accordingly the concentration of D-lactic acid after hydrolysis (D% by weight) is:

$$D=(180/144)B+(90/144)Y+Z+(180/162)W \qquad (1)$$

On the other hand, the concentration of L-lactic acid after hydrolysis is the sum of the followings: those derived from L-lactide; (180/144) A% by weight; and, those derived from meso-lactide; (90/144) Y% by weight. Accordingly, the concentration of L-lactic acid after hydrolysis (L% by weight) is:

$$L=(180/144)A+(90/144)Y \qquad (2)$$

In this context, the optical purity X%ee of L-lactic acid is:

$$X=100(L-D)/(L+D).$$

This equation is substituted with the equations (1) and (2) described above and B is eliminated based on the equation A+B=V, and then A is solved as follows:

$$A=(1/2)V+(4/9)W+Y+(2/5)Z+(1/200)VX+(1/225)WX+(1/200)XY+(1/250)XZ \qquad (3).$$

By substituting V, X, Y. Z and W in the equation (3) with respective values measured, the concentration of L-lactide, i.e., A% by weight, can be obtained.

EXAMPLE 2

Ethanol Contact Method

The crude lactide obtained in Synthesis example 1 was ground by using a mortar, and allowed to pass through a 10-mesh sieve. 50 g of the crude lactide which passed through this sieve was mixed with 15 g of a 99% strong 1st grade non-denatured ethanol (brewed alcohol) at 25° C. in a beaker to obtain a slurry mixture, which was stirred by using a stirrer for 15 minutes. This slurry was transferred to a glass filter (Buchner type, Maximum pore size: 20 to 30 μm) mounted on a filtrate receiver, which was aspirated by aspirator for 1 minute to effect a suction filtration of the liquid in the slurry.

After filtering with suction, the glass filter received further 15 g of a 99% strong 1st grade non-denatured ethanol (brewed alcohol) at 25° C., and the filtrate receiver was aspirated by aspirator for 1 minute to effect a suction filtration.

After the suction filtration, 25 g of water at 25° C. was newly added to the glass filter and the filtrate receiver was aspirated by aspirator immediately to effect a suction filtration.

A solid thus separated was dried by using a rotary evaporator at 40° C. and 4 Torr for 2 hours to obtain 43.5 g of a purified lactide (purification yield: 87.0%).

The composition of the crude lactide thus obtained was analyzed by an HPLC, which revealed L-lactide and D-lactide: 98.23% by weight, meso-lactide: 1.11% by weight, linear lactic acid dimer:0.27% by weight and lactic acid:0.39% by weight.

The ethanol content of this purified lactide, when determined by using a GC, was 34 ppm, and almost no ethanol odor was experienced. The moisture content of this purified lactide, when determined by using a Karl Fischer's moisture meter, was 89 ppm.

The purified lactide obtained in this example was a particle having good fluidity, and its fluidity was scarcely lost even after storage at 20° C. for 1 month while being closed tightly.

EXAMPLE 3

Ethanol Contact Method (Lactide Synthesis)

A 1.3 kL reactor fitted with a thermometer, a stirrer, a condenser, a distillate receiver, a depressurizer, a thermostat and the like received 1000 kg of lactic acid (available from Purac, HS-88: Concentration as lactic acid monomer: 88.1% by weight, Optical purity: 99.2% e.e.). The reaction was performed first under normal pressures at 130° C. for 3 hours and then under reduced pressure with heating from 130° C. to 160° C. gradually over 6 hours, whereby obtaining approximately 702 kg of a polylactic acid whose weight-average molecular weight based on a GPC was 2490.

To this polylactic acid having a low molecular weight, 10.0 kg of tin octylate was added and the mixture was heated under reduced pressure gradually from 160° C. to 200° C. to recover 697 kg of a crude lactide as a distillate over about 3 hours.

The composition of the crude lactide thus obtained was analyzed by an HPLC, which revealed L-lactide and D-lactide: 91.93% by weight, meso-lactide:4.18% by weight, linear lactic acid dimer:0.64% by weight and lactic acid:3.25% by weight.

(Lactide Purification)

A 1.8 kL mixing tank fitted with a disk turbine blade stirring device, a thermometer, a thermostat and the like received 530 L of a 99% strong 1st grade non-denatured ethanol (brewed alcohol), and cooled to 10° C.

While stirring the mixing tank by using the disk turbine blade at 60 rpm, the entire amount of the crude lactide synthesized as described above, which was kept molten (103° C.), was supplied over about 60 minutes at the rate of about 10 L per minute via 4 nozzles (each 2 mm in diameter) capable of pouring as a shower.

During the supply of the molten crude lactide, the thermostat was used to prevent the internal temperature in the mixing tank from being raised, but the cooling capacity was insufficient, resulting in the internal temperature at the end of the supply being 32° C.

After completion of the supply, the stirring and the temperature control (set at 20° C.) were still continued. The internal temperature 1 hour after completion of the supply was 20° C. One hour after completion of the supply, about ⅕ of the slurry in the mixing tank was supplied over about 90 seconds to a basket centrifugal filter whose basket diameter was 1000 mm and whose basket depth was 400 mm, whereby separating the solid in the slurry. During the supply of the slurry, the basket was rotated at 300 rpm.

After completion of the supply of the slurry, the rotation speed of the basket was increased to 800 rpm to perform removing liquid for 10 minutes in order to obtain a better separation of the solid.

After removing liquid, the rotation speed of the basket was reduced to 500 rpm and 71 L (56.0 kG) of a 99% strong 1st grade non-denatured ethanol (brewed alcohol) at 20° C. was sprayed via a spray nozzle for rinsing fluid over a period of about 120 seconds, whereby effecting the contact of the solid in the basket with fresh ethanol simultaneously with the separation of the solid.

After completion of the ethanol supply, the rotation speed of the basket was increased to 800 rpm to perform removing liquid for 10 minutes in order to obtain a better separation of the solid.

After removing liquid, the solid in the basket was scraped up and transferred into a 1.1 kL conical rotary drier (double-cone drier).

Thereafter, the procedure from the supply of the slurry to the centrifugal filter through the transfer of the solid into the conical rotary drier was repeated 4 times, whereby completing the processing of the entire amount of the slurry in the mixing tank.

The conical rotary drier was operated at 10 rpm and the solid contained therein was dried at 50° C. and 2 Torr for 6 hours to yield 611 kg of a purified lactide (purification yield: 87.0%).

The composition of the crude lactide thus obtained was analyzed by an HPLC, which revealed L-lactide and D-lactide: 98.76% by weight, meso-lactide:0.82% by weight, linear lactic acid dimer:0.19% by weight and lactic acid:0.23% by weight.

The ethanol content of this purified lactide, when determined by using a GC, was 360 ppm, and a slight ethanol odor was experienced. The moisture content of this purified lactide, when determined by using a Karl Fischer's moisture meter, was 21 ppm.

The purified lactide obtained here was a particle having good fluidity, and its fluidity was not lost even after storage at 20° C. for 1 month while being closed tightly.

EXAMPLE 4

Non-denatured Ethanol Recrystallization Method 200.0 g of the crude lactide obtained in Synthesis example 1 described above was mixed with 200.0 g of a non-denatured ethanol and the mixture was heated at 70° C. with stirring to dissolve the crude lactide completely.

The solution thus obtained was cooled to 15° C. with stirring to precipitate a lactide as a slurry.

This slurry was transferred to a glass filter (Buchner type, Maximum pore size: 20 to 30 µm) mounted on a filtrate receiver, which was aspirated by aspirator for approximately 2 minutes to effect a suction filtration of the liquid in the slurry.

A solid separated was dried by using a rotary evaporator at 60° C. and 10 Torr for 2 hours to obtain 144.9 g of a purified lactide.

The composition of the purified lactide thus obtained was analyzed by an HPLC, which revealed L-lactide and D-lactide: 99.65% by weight, meso-lactide: 0.24% by weight, linear lactic acid dimer:0.03% by weight and lactic acid:0.00% by weight.

The moisture content of this purified lactide, when determined by using a Karl Fischer's moisture meter, was 27 ppm.

The purified lactide obtained here was a particle having good fluidity, and its fluidity was not lost even after storage at 20° C. for 1 month while being closed tightly.

(Calculation of L-lactide in Purified Lactide)

The purified lactide thus obtained was hydrolyzed and analyzed by an HPLC, which revealed that the optical purity of L-lactic acid was 99.3%ee. Accordingly, the calculation was made similarly as in Example 1 and the concentration of L-lactide in the total amount of the lactides was 99.6% by weight or more.

EXAMPLE 5

Use of Lactide as Coagulating Agent for Tofu 30 g of the purified lactide obtained in Example 4 was dispersed in 50 ml of water. These dispersions were added to 10 kg of soymilk at 83° C. whose solid content was adjusted at 10% by weight, and the mixture was allowed to stand for cooling for 15 minutes, whereby effecting a coagulation. After compressing, pulling from box, and soaking in water in accordance with a customary procedure, a "MOMEN" tofu was obtained.

The tofu thus obtained had a uniform and fine section and exhibited satisfactory taste and flavor.

EXAMPLE 6

Denatured Ethanol Recrystallization Method

A denatured ethanol containing 5.0 g of Flavor H-11 available from HASEGAWA KORYO, Inc. as a denaturant per 1 L of a 99% strong 1st grade ethanol was employed.

300.0 g of this denatured ethanol was mixed with 200.0 g of the crude lactide obtained in Synthesis example 1 described above. The mixture was heated at 60° C. with stirring to dissolve the crude lactide completely.

The solution thus obtained was cooled to 15° C. with stirring to precipitate a lactide as a slurry.

This slurry was transferred to a glass filter (Buchner type, Maximum pore size: 20 to 30 μm) mounted on a filtrate receiver, which was aspirated by aspirator for approximately 2 minutes to effect a suction filtration of the liquid in the slurry.

After the suction filtration. 100 g of a 99% strong 1st grade denatured ethanol (fermented alcohol) at 15° C. was newly added to the glass filter and the filtrate receiver was aspirated by aspirator for approximately 2 minutes to effect a suction filtration.

A solid separated was dried by using a rotary evaporator at 40° C. and 4 Torr for 2 hours to obtain 161.2 g of a purified lactide.

The composition of the purified lactide thus obtained was analyzed by an HPLC, which revealed L-lactide and D-lactide:99.72% by weight, meso-lactide:0.18% by weight, linear lactic acid dimer:0.02% by weight and lactic acid:0.00% by weight.

The moisture content of this purified lactide, when determined by using a Karl Fischer's moisture meter, was 22 ppm.

The purified lactide obtained here was a particle having good fluidity, and its fluidity was not lost even after storage at 20° C. for 1 month while being closed tightly.
(Calculation of L-lactide in Purified Lactide)

The purified lactide thus obtained was hydrolyzed and analyzed by an HPLC, which revealed that the optical purity of L-lactic acid was 99.4%ee. Accordingly, the calculation was made similarly as in Example 1 and the concentration of L-lactide in the total amount of the lactides was 99.7% by weight or more.

EXAMPLE 7

Use of Lactide as Coagulating Agent for Tofu

The purified lactide obtained in Example 6 was ground by using a mortar and a 0.60 g of grinds was added to 200 g of soymilk at 25° C. (solid content: 10% by weight) and then the mixture was stirred.

The mixture was heated at 85° C. for 30 minutes to coagulate the soymilk. Subsequently, the coagulated soymilk was cooled in a cold water at 5° C., whereby obtaining a tofu.

The tofu thus obtained had a uniform and fine section and exhibited satisfactory taste and flavor.

In the following Examples 8 to 14, the purified lactide obtained in Example 1 was employed.

EXAMPLE 8

Use of Lactide as Coagulating Agent for an Animal Protein

The change in the gel strength of a protein which undergoes a thermal denaturation upon heating to form a gel was examined. As a protein, a whey protein isolate (hereinafter abbreviated as "WPI") was employed. WPI and the lactide or glucono-δ-lactone (hereinafter abbreviated as "GDL") were mixed in various weight ratios shown in Table 1, and then mixed with water and stirred by using a stirrer.

The solution thus obtained was placed in a vessel, which was heated to 70° C. When the temperature reached 70° C., the mixture was allowed to stand for cooling to room temperature (20 to 25° C.), at which it was allowed to stand for 1 hour. At this time point, the gel strength (g/cm$^3$) was determined by using a curd meter (IIO DENKI).

As evident from Table 1, GDL suppressed gel-forming ability by thermal denaturation of WPI prior to the reaction with WPI to form a firm gel because of low pH due to gluconic acid generated by GDL degradation. As a result, the gel strength was below the detectable limit of the curd meter.

On the other hand, the lactide underwent a relatively low degradation prior to the heating, and did not cause the thermal denaturation of WPI, resulting in a firm gel-formation.

TABLE 1

Compositions by weight and Gel Strengths

| | | | | | | | | | | |
|---|---|---|---|---|---|---|---|---|---|---|
| WPI (% by weight) | 5 | 5 | 5 | 5 | 5 | 5 | 5 | 5 | 5 | 5 |
| Lactide (% by weight) | 0.2 | 0.3 | 0.4 | 0.5 | 0.6 | — | — | — | — | — |
| GDL (% by weight) | — | — | — | — | — | 0.2 | 0.3 | 0.4 | 0.5 | 0.6 |
| Water (% by weight) | 94.8 | 94.7 | 94.6 | 94.5 | 94.4 | 94.8 | 94.7 | 94.6 | 94.5 | 94.4 |
| Gel Strength (g/cm$^3$) | 280 | 275 | 277 | 281 | 276 | — | — | — | — | — |

EXAMPLE 9

Use of Lactide as Coagulating Agent for an Animal Protein

A cream cheese-like food was prepared.

Using a fluid obtained by hydrating and dissolving 12.75 kg of sodium casein and 1.49 kg of a powdered thick malt syrup in 65.32 kg of water as a water phase and a fluid obtained by dissolving 280 g of sorbitan fatty ester and 1 g of β-carotene together with a flavor in 48.28 kg of a melted vegetable oil (mixture of 7 parts of a microhydrogenated rapeseed oil and 3 parts of a palm oil) as an oil phase, the water phase and the oil phase were mixed at 70° C.

To this mixture, 85.2 g of a powdered calcium hydroxide and 333.7 g of calcium chloride dehydrate which had previously been dissolved in 2 kg of water and 53.4 g of disodium hydrogen-phosphate dodecahydrate and 32 g of potassium hydrogen-phosphate which had previously been dissolved in 800 g of water were added in this order. Subsequently, the mixture was sterilized and homogenized, and then cooled to 30° C. to obtain an emulsion.

To this emulsion, 600 g of the lactide and a rennet solution (140 mg as powder) were added and the mixture was kept at 30° C. for 5 hours, whereby obtaining approximately 132 kg of a liquid acidic emulsion at pH 5.6.

This was mixed with 1000 g of a salt, 840 g of the lactide, 490 g of guar gum and 2.1 kg of a powdered thick malt syrup and the mixture was sterilized at 87° C. in a melting furnace. Subsequently, the mixture was filled into a vessel and cooled to obtain a food having a flavor extremely similar to that of a cream cheese. This flavor was closer to a natural flavor than a food obtained by using GDL instead of the lactide.

EXAMPLE 10

Use of Lactide as Coagulating Agent for an Animal Protein

A "TAMAGOTOFU"-like food was prepared.

100 kg of a powdered egg and 0.1 g of a salt were dissolved in 1200 g of water, and the mixture was heated with stirring. After boiling, 4 g of the lactide was added, and immediately after a gentle stirring the mixture was poured into a vessel where the mixture was solidified with cooling. A jelly-like "TAMAGOTOFU"-like food was obtained. This food exhibited a better flavor than that obtained using GDL instead of the lactide.

EXAMPLE 11

Use of lactide as a Coagulating Agent for an Animal Protein

A yogurt-like food was prepared.

80% by weight of a powdered skim milk solution (solid content: 12%) and 20% by weight of a separated soybean protein were dissolved in water, heated, boiled and then cooled to obtain a mixture solution whose solid content was 12%.

1 L of this mixture solution was mixed with 15 g of the lactide and 600 units of bromelain (NAKAIKAGAKU), and heated at 70° C. for 40 minutes, and then cooled. A yogurt-like food was obtained. This food exhibited a better flavor than that obtained using GDL instead of the lactide.

EXAMPLE 12

Use of Lactide as Food Foaming Agent

A cake mix powder was prepared.

10 g of shortening, 4 g of glycerin monostearate and 4 g of propylene glycol monostearate were mixed at about 60° C. 100 g of a flour and 3.0 g of the lactide were placed in a cake mixer, and the mixed fat described above was added to the flour and lactide with stirring to form an uniform mixture. After cooling, 100 g of sucrose, 30 g of a powdered fat (fat content: 70% by weight), 1.5 g of a salt, 4 g of a powdered skim milk, 0.5 g of carrageenan, 0.4 g of a powdered lecithin (lecithin content: 50% by weight) and 1.5 g of sodium hydrogen carbonate were added to obtain a cake mix powder.

200 g of the resultant cake mix powder was mixed with two eggs and 100 ml of a milk, and mixed thoroughly and baked gently using a microwave oven to obtain a sponge-like cake after 5 minutes. This cake exhibited a milder and better flavor than that obtained from a cake mix powder containing GDL instead of the lactide.

EXAMPLE 13

Use of Lactide as Food Preservative

Using a custard cream sample, the food preserving effect of the added lactide was investigated.

| (Formulation) | |
|---|---|
| Milk | 1200 mL |
| Egg | 750 g |
| Sugar | 500 g |
| Flour | 80 g |
| Corn starch | 90 g |

The material obtained by mixing the components shown above was divided into 4 equal portions, each of which were mixed with -0 by weight (no addition), 0.25% by weight, 0.5% by weight or 1% by weight of the lactide, and then processed by a standard method to obtain a custard cream sample.

Each custard cream sample was placed in a thermostat chamber at 35° C. and then sampled at certain time intervals to investigate the general living bacterium count per 1 g. The results are shown in Table 2.

As evident from Table 2, the addition of the lactide served to reduce the bacterial growth.

TABLE 2

Food Preserving Effect of Added Lactide

| Added Lactide Level (% by weight) | General Living Bacterium Count (per 1 g) | | | | | | |
|---|---|---|---|---|---|---|---|
| | 0 Hour | 4 Hours | 8 Hours | 12 Hours | 24 Hours | 48 Hours | 60 Hours |
| 0 | $8.0 \times 10^1$ | $3.0 \times 10^2$ | $4.0 \times 10^3$ | $6.0 \times 10^4$ | $1.2 \times 10^8$ | Uncountably large number | Uncountably large number |
| 0.25 | $3.0 \times 10^1$ | $3.0 \times 10^1$ | $4.0 \times 10^1$ | $7.0 \times 10^2$ | $5.6 \times 10^4$ | $3.5 \times 10^5$ | $2.8 \times 10^6$ |
| 0.5 | $2.0 \times 10^1$ | $2.0 \times 10^1$ | $2.0 \times 10^1$ | $1.2 \times 10^2$ | $7.3 \times 10^2$ | $8.2 \times 10^3$ | $5.2 \times 10^4$ |
| 1.0 | $1.0 \times 10^1$ | $1.0 \times 10^1$ | $1.0 \times 10^1$ | $5.0 \times 10^1$ | $1.2 \times 10^2$ | $2.4 \times 10^2$ | $1.0 \times 10^3$ |

EXAMPLE 14

Use of Lactide as pH Regulating Agent

A rice food product was prepared.

10 kg of a raw rice was supplemented with 60 g of the lactide and cocked.

Separately, a salmon flake whose salt content was 15% was supplemented with the lactide, stirred, vacuum-packed and then sterilized by boiling for 30 minutes to obtain a salted salmon flake at pH 4.2.

This salted salmon flake was put into the cooked rice, and pressed into a shape to form a rice ball ("ONIGIRI"). This rice ball was wrapped with a synthetic resin film and then cocked by a microwave oven at 70 to 90° C. for 10 minutes. Subsequently, the rice ball was cooled in vacuum until the temperature of the rice was lowered to 25° C.

The rice ball thus obtained was placed in a thermostat chamber at 30° C. and then examined after 5 days for the general living bacterium count per 1 g as well as its taste and flavor.

For comparison, a rice ball was obtained similarly except for using a rice which was supplemented with a vinegar after cooking to adjust the pH at 4.7. This rice ball was also examined similarly. The results are shown in Table 3.

TABLE 3

| | After 3 days | | After 5 days | |
| --- | --- | --- | --- | --- |
| | Living Bacterium Count per 1 g | Organoleptic Test | Living Bacterium Count per 1 g | Organoleptic Test |
| Supplemented with Lactide | $2.0 \times 10^4$ or less | Normal | $3.0 \times 10^4$ or less | Slightly aged rice |
| Supplemented with Vinegar (comparison) | $7.0 \times 10^4$ or less | Slightly aged rice | — | — |

The present invention can be embodied In many other ways without departing from the spirit and the major aspects of the invention. Accordingly, the examples described above are only illustrative and should not be interpreted to be limitative. Furthermore, any modification within the scope of the appended claims is encompassed In the invention.

INDUSTRIAL APPLICABILITY

As described above, the present invention allows a purified lactide whose L-lactide and/or D-lactide content is high to be obtained at a high yield within a short period by using a simple device and a simple procedure. The invention also allows a purified lactide which can be handled easily to be obtained without allowing an organic solvent which is hazardous to human health to remain.

A purified lactide obtained according to the invention is less expensive and used preferably in food additives.

Also according to the invention, various food additives each of which contains a lactide as a main component can be provided. For example, coagulating agent for an animal and/or vegetable protein containing an optically active lactide as a main component, a food foaming agent containing a lactide as a main component, a food preservative containing a lactide as a main component and a pH regulating agent containing a lactide as a main component are provided.

What is claimed is:

1. A method for purifying a lactide which comprises bringing a crude lactide in a solid state or in an at least partially molten state into contact with ethanol to form a slurry mixture, and then separating a solid from the slurry mixture to yield a purified lactide having a high L-lactide and/or D-lactide content.

2. A method for purifying a lactide according to claim 1 which comprises, after separating a solid, drying said solid under reduced pressure.

3. A method for purifying a lactide according to claim 1 which comprises, after separating a solid, washing said solid with water to remove ethanol.

4. A method for purifying a lactide according to claim 3 which comprises, after washing a solid with water, drying said solid under reduced pressure.

5. A method for purifying a lactide according to any one of claims 1 to 4 wherein a crude lactide to be purified is a molten crude lactide obtained by depolymerizing a polylactic acid having a low molecular weight.

6. A purified lactide obtained by a method according to claim 1.

7. An optically active purified lactide obtained by a method according to claim 1.

8. A method for purifying a lactide which comprises recrystallizing a crude lactide from a non-denatured ethanol to obtain a lactide for a food additive.

9. A method for purifying a lactide which comprises recrystallizing a crude lactide from a denatured ethanol to obtain a lactide for a food additive.

10. A method for purifying a lactide according to claim 9 wherein a denaturant contained in a denatured ethanol is selected from flavors capable of being employed as food additives.

11. A method for purifying a lactide according to claim 9 wherein a denaturant contained in a denatured ethanol is at least one of ethyl acetate, butyl p-oxybenzoate, a white lac, a purified shellac, a white lac solution and a purified shellac solution.

12. A lactide obtained by a method according to claim 8 for food additives recrystallized from a non-denatured ethanol or a denatured ethanol.

13. An optically active lactide obtained by a method according to claim 8 for food additives recrystallized from a non-denatured ethanol or a denatured ethanol.

14. A lactide obtained by a method according to claim 9 for food additives recrystallized from a non-denatured ethanol or a denatured ethanol.

15. An optically active lactide obtained by a method according to claim 9 for food additives recrystallized from a non-denatured ethanol or a denatured ethanol.

16. A coagulating agent for a vegetable protein containing a lactide for food additives according to claim 12 or 14 as a main component.

17. A food additive containing a lactide according to claim 6 or 12 or 14 as a main component.

18. A food additive according to claim 17 wherein said food additive is a coagulating agent for an animal protein, a food foaming agent, a food preservative, a pH regulating agent or an acidulant.

19. A coagulating agent for a protein containing a lactide obtained by a method according to claim 1 or 8 or 9 as a main component.

20. A coagulating agent for a protein according to claim 19 wherein the protein is an animal protein and/or a vegetable protein.

21. A coagulating agent for a protein according to claim 19 wherein said lactide is optically active.

22. A coagulating agent for a protein according to claim 21 wherein said optically active lactide is an L-isomer.

23. A coagulating agent for a protein according to claim 22 wherein said L-lactide is present in an amount of 85% by weight or more based on the total amount of the lactides.

24. A coagulating agent for a protein according to claim 21 wherein said optically active lactide is a D-isomer.

25. A coagulating agent for a protein according to claim 24 wherein said D-lactide is present in an amount of 85% by weight or more based on the total amount of the lactides.

26. A coagulating agent for a protein according to claim 19 wherein the amount of a lactic acid monomer and/or a linear lactic acid polymer contained in the lactides is 2.0% by weight or less.

27. A coagulating agent for a protein according to claim 19 wherein said lactide is synthesized from a lactic acid obtained by fermentation as a staring material.

28. A coagulating agent for a protein according to claim 19 wherein said lactide is synthesized from a lactic acid as a staring material which is obtained by fermentation and whose optical purity of the L-isomer or D-isomer is 90%ee or higher.

29. A yogurt, cheese, tofu, ham, sausage or boiled fish paste produced by using a coagulating agent for a protein according to claim 19.

30. A food foaming agent containing a lactide obtained by a method according to claim 1 or 8 or 9 as a main component.

31. A food foaming agent according to claim 30 wherein said lactide is optically active.

32. A food foaming agent according to claim 29 wherein said optically active lactide is an L-isomer.

33. A food foaming agent according to claim 32 wherein said L-lactide is present in an amount of 85% by weight or more based on the total amount of the lactides.

34. A food foaming agent according to claim 31 wherein said optically active lactide is a D-isomer.

35. A food foaming agent according to claim 34 wherein said D-lactide is present in an amount of 85% by weight or more based on the total amount of the lactides.

36. A food foaming agent according to claim 27, wherein the amount of a lactic acid monomer and/or a linear lactic acid polymer contained in the lactides is 2.0% by weight or less.

37. A food foaming agent according to claim 30 wherein said lactide is synthesized from a lactic acid as a staring material which is obtained by fermentation and whose optical purity of the L-isomer or D-isomer is 90%ee or higher.

38. A food preservative containing a lactide obtained by a method according to claim 1 or 8 or 9 as a main component.

39. A food preservative according to claim 38 wherein said lactide is optically active.

40. A food preservative according to claim 39 wherein said optically active lactide is an L-isomer.

41. A food preservative according to claim 40 wherein said L-lactide is present in an amount of 85% by weight or more based on the total amount of the lactides.

42. A food preservative according to claim 39 wherein said optically active lactide is a D-isomer.

43. A food preservative according to claim 42 wherein said D-lactide is present in an amount of 85% by weight or more based on the total amount of the lactides.

44. A food preservative according to claim 38 wherein the amount of a lactic acid monomer and/or a linear lactic acid polymer contained in the lactides is 2.0% by weight or less.

45. A food preservative according to claim 38 wherein said lactide is synthesized from a lactic acid as a staring material which is obtained by fermentation and whose optical purity of the L-isomer or D-isomer is 90%ee or higher.

46. A pH regulating agent containing a lactide obtained by a method according to claim 1 or 8 or 9 as a main component.

47. A pH regulating agent according to claim 45 wherein said lactide is optically active.

48. A pH regulating agent according to claim 47 wherein said optically active lactide is an L-isomer.

49. A pH regulating agent according to claim 48 wherein said L-lactide is present in an amount of 85% by weight or more based on the total amount of the lactides.

50. A pH regulating agent according to claim 47 wherein said optically active lactide is a D-isomer.

51. A pH regulating agent according to claim 50 wherein said D-lactide is present in an amount of 85% by weight or more based on the total amount of the lactides.

52. A pH regulating agent according to claim 46 wherein the amount of a lactic acid monomer and/or a linear lactic acid polymer contained in the lactides is 2.0% by weight or less.

53. A pH regulating agent according to claim 45 wherein said lactide is synthesized from a lactic acid as a starting material which is obtained by fermentation and whose optical purity of the L-isomer or D-isomer is 90%ee or higher.

* * * * *